United States Patent [19]
Baker et al.

[11] Patent Number: 5,317,671
[45] Date of Patent: * May 31, 1994

[54] SYSTEM FOR METHOD FOR PRODUCING SYNTHETIC PLURAL WORD MESSAGES

[76] Inventors: Bruce R. Baker, 840 Rolling Rock Rd., Pittsburgh, Pa. 15234; Richard D. Creech, Rt. 3, Box 170A, Siler City, N.C. 27344; Kenneth W. Smith, 3316 Englewood Rd., Wilmington, Del. 19810

[*] Notice: The portion of the term of this patent subsequent to Apr. 28, 2004 has been disclaimed.

[21] Appl. No.: 796,926

[22] Filed: Nov. 22, 1991

Related U.S. Application Data

[63] Continuation of Ser. No. 573,276, Aug. 27, 1990, abandoned, which is a continuation of Ser. No. 325,044, Mar. 16, 1989, abandoned, which is a continuation of Ser. No. 3,464, Jan. 15, 1987, abandoned, which is a continuation of Ser. No. 815,916, Dec. 27, 1985, which is a continuation of Ser. No. 659,878, Oct. 15, 1984, abandoned, which is a continuation of Ser. No. 340,287, Nov. 18, 1982, abandoned.

[51] Int. Cl.⁵ ............................................. G01L 5/02
[52] U.S. Cl. ...................................... 395/2; 395/2.67; 381/51
[58] Field of Search ................ 381/51, 53, 36; 395/2, 395/2.67, 2.7

[56] References Cited

U.S. PATENT DOCUMENTS

| | | | |
|---|---|---|---|
| 3,662,348 | 5/1972 | Weiss | 381/51 |
| 4,215,240 | 7/1980 | Ostrowski | 381/51 |
| 4,270,022 | 5/1981 | Loh | 341/28 |
| 4,307,266 | 12/1981 | Messina | 379/88 |
| 4,328,562 | 5/1982 | Hashimoto | 381/51 |
| 4,333,092 | 6/1982 | Field | 434/112 |

OTHER PUBLICATIONS

Patent Office Japan, "Government Date of Application", 1981.
Encyclopedia, "Language . . . ".

Primary Examiner—Dale M. Shaw
Assistant Examiner—Kee M. Tung
Attorney, Agent, or Firm—Birch, Stewart, Kolasch & Birch

[57] ABSTRACT

A linguistic coding system and keyboard therefor for the use of people unable to use their own voices is described. The coding system and associated keyboard are based on the sentence rather than the word, phoneme or letter. The keyboard is coupled to a computer which stores a plurality of plural word messages or sentences in the memory thereof for selective retrieval by the keyboard. The sentences retrieved from the keyboard are fed to a voice synthesizer which converts them through a loud speaker to audible spoken messages The keyboard utilizes polysemic symbols on the respective keys and by designating a selected one of the keys and its associated polysemic symbols a primary message theme key, selected recorded plural messages in the computer memory may be retrieved by actuating a combination of the designated primary message theme key and other keys to vary the context of the polysemic symbols. Thus a plurality of sentences associated with a central theme may be selectively generated as a function of each polysemic symbol in combination with other symbols which modify the theme of the message or sentence.

18 Claims, 3 Drawing Sheets

SYSTEM FOR METHOD FOR PRODUCING SYNTHETIC PLURAL WORD MESSAGES

This application is a continuation of prior application Ser. No. 07/573,276, filed on Aug. 27, 1990, now abandoned, which is a continuation of Ser. No. 07/325,044 filed on Mar. 16, 1989, now abandoned, which is a continuation of Ser. No. 003,464 filed on Jan. 15, 1987 now abandoned, which is a continuation of Ser. No. 815,196 filed on Dec. 27, 1985 which which is now U.S. Pat. No. 4,661,916 which is a continuation of Ser. No. 659,878 filed Oct. 15, 1984 now abandoned, which is a continuation of Ser. No. 340,287 filed Jan. 18, 1982 now abandoned.

BACKGROUND OF THE INVENTION

The present invention relates to a linguistic coding system and keyboard therefor for use by people unable to use their own voices to create either synthetic speech or synthetic printed messages. More specifically, the present invention is related to a synthetic speech or printing device based on the sentence or message rather than the word, phoneme or letter.

Heretofore synthetic speech or typing devices have coding systems based on words, phonemes or letters which are implemented with keyboards with indicia thereon related to the word, phoneme or letter. These systems are very complicated to use because they require an extraordinarily large number of symbols or indicia in order to have the capability to generate entire sentences or plural sentence messages. This extraordinarily large number of keys and symbols makes it difficult to memorize the necessary relationships to generate a sentence and in addition requires an extremely large number of key actuations for a given sentence or message. Thus, not only is it difficult to teach an operator how to use one of these prior devices it takes entirely too long to generate sentences or other plural word messages making these prior art machines unsatisfactory for general use.

SUMMARY OF THE INVENTION

Accordingly it is an object of the present invention to provide a synthetic speech device which may go directly from thought to speech without the need to record word, phoneme and letter data as individual entities.

It is another object of the present invention to provide a synthetic speech or typing device which stores and retrieves whole sentences or plural word messages for selective retrieval other than individual words, phonemes or letters.

It is still another object of the present invention to provide a synthetic speech or printing device with an improved keyboard which minimizes the maximum number of necessary key actuations to generate a sentence or a plural word message.

It is still another object of the present invention to utilize polysemic symbols on the individual keys of the keyboard of the device of the present invention which may correspond to pictorial illustrations of real life objects.

It is a further object of the present invention to utilize polysemic symbols on the keys of the keyboard because such symbols are more easily memorized than alpha numeric characters.

It is still a further object of the present invention to provide a coding system, method and keyboard therefor which is adaptable to individual design by the operator to further enhance the memory capacity of an operator.

It is yet another object of the present invention to provide a coding system, method and keyboard therefor which is adaptable to either high intellectual or cultural levels of an operator or to the intellectual level of the uneducated.

It is a further object of the present invention to utilize polysemic symbols in a coding system so that no reading skills are required to operate the synthetic speech or typing device of the present invention.

It is still a further object of the present invention to provide a coding system utilizing polysemic symbols to preclude the need for good spelling skills in utilization of the device.

It is yet another object of the present invention to produce a synthetic speech device with auditory clarity based on a linguistic analysis of the sentence structure which is stored in the memory for retrieval.

The objects of the present invention are fulfilled by providing a system for producing plural word synthetic messages from a compilation of predetermined plural word messages stored in a memory in response to the actuation of selected keys on a keyboard, said actuation of said keys selectively retrieving desired messages from said memory, at least one theme key means in said keyboard bearing a polysemic symbol related to a theme of the message to be retrieved from said memory means for storing a plurality of said predetermined plural word messages having message themes related to the respective polysemic symbols used in said message and a plurality of modifying key means with coded indicia thereon for selective actuation in combination with said at least one theme key means to selectively retrieve one of said plural word messages having a theme associated with the polysemic symbol on the actuated theme key means.

The memory is provided in a computer or microprocessor and stores complete sentences or plural word messages rather than individual words, phonemes or letters. The microprocessor or computer is coupled to a commercially available voice synthesizer which converts the digital signals emerging therefrom into analog signals which drive a loudspeaker and generate audible synthetic speech. In the alternative to a voice synthesizer a suitable printer may be utilized to directly convert the retrieved selected messages or sentences into printed messages on a suitable paper or substrate.

The system of the present invention allows an operator to go directly from thought to speech This is possible because each key on the keyboard of the present invention bears a central image or symbol which is polysemic and illustrates an important aspect of life and/or linguistic function. The keyboards may vary depending on the intellectual level of the intended operator. Therefore, each keyboard may in itself be a language which has been designed for or with a specific user. Each of the polysemic symbols is rich in associations and in combination signals sentence ideas in the operator's memory. This enables the generation of plural word or whole sentence messages by the actuation of as few as two keys or as many as seven keys. The devices of the present invention may generate hundreds of sentences which may be easily retrieved from memory because of the ease with which the polysemic symbols on the keys portray the production of whole thoughts.

BRIEF DESCRIPTION OF THE DRAWINGS

The objects of the present invention and the attendant advantages thereof will become more readily apparent by reference to the accompanying drawings wherein like reference numerals refer to like parts and further wherein.

DETAILED DESCRIPTION OF PREFERRED EMBODIMENT

Figure 1:
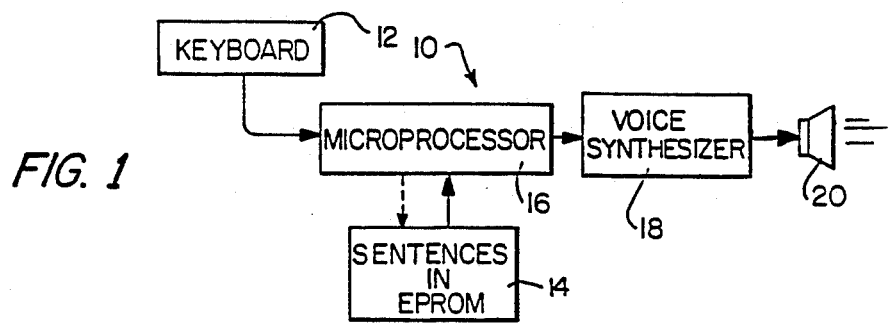
FIG. 1 is a schematic block diagram of a synthetic speech device of the present invention.

Referring to FIG. 1 there is illustrated the synthetic voice generating device of the present invention generally designated 10. The device 10 consists of a keyboard 12 of a type illustrated in FIGS. 2 and 3 to be discussed hereinafter with its output coupled to a microprocessor 16. One microprocessor suitable for use with the present invention is an AIM-65 marketed by Rockwell International. Associated with microprocessor 16 is a suitable electrical programmable read only memory (EPROM) 14. EPROM 14 stores complete sentences or plural word messages without regard to individual words, phonemes or letters. Coupled to the output of microprocessor 16 is a commercially available speech synthesizer 18 such as one designated Voltrax Speech PAC with an SC-01 voice synthesizer chip therein marketed by Vodex. The output of the voice synthesizer 18 is in turn coupled to a loudspeaker 20 which generates audible synthetic speech in a manner well known in the art.

Figure 2:
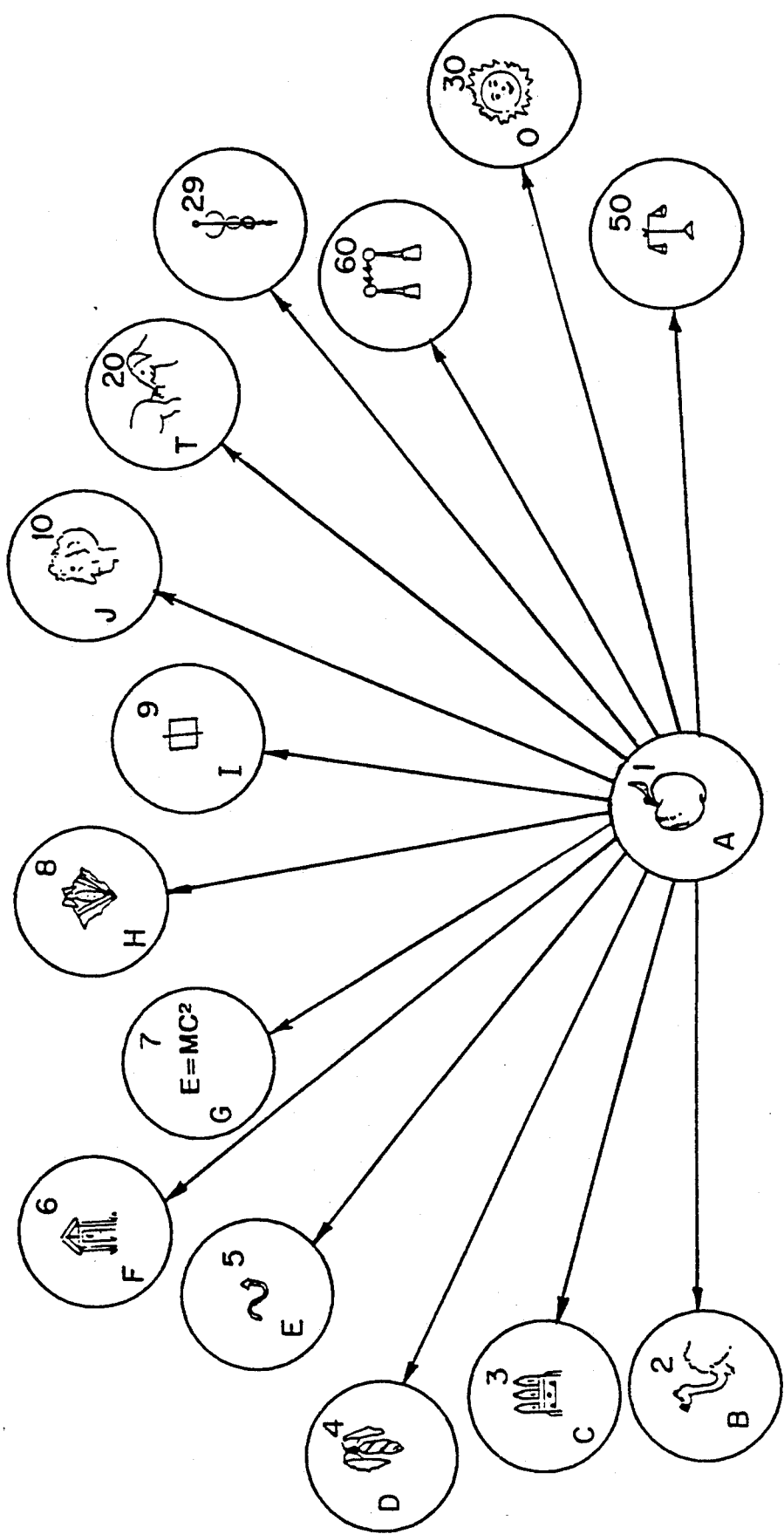
FIG. 2 is a schematic diagram of a preferred embodiment of a keyboard coded and marked with polysemic symbols in accordance with the present invention, each circle representing an individual key on the keyboard.

Referring in detail to FIG. 2 there is illustrated one embodiment of a keyboard for practicing the present invention wherein each of the circles represents an individual key of the keyboard. Each of the keys includes a centrally disposed picture of a real life object or illustration centrally disposed thereon. The majority of the keys also have identifying sequential numbers such as 1 to 10, 20, 30 and 50 in examples shown in FIG. 2; an alphabetical letter corresponding to the numbers; a portion of the human anatomy and a proper name. Accordingly, the keys may take on many different meanings depending on the sequence and combination in which they are operated since they contain not only the polysemic symbols (real life objects or expressions) in the center of the keys but additional indicia relating to other possible meanings of information associated with that key. The keyboard of FIG. 2 is designed to be used by someone with a relatively high level of intellectual achievement and education. A more simplistic keyboard designed for users of a lower intellectual level will be described hereinafter with reference to FIG. 3.

Referring further to FIG. 2 the respective keys of the keyboard 1 to 10, 20, 29, 30, 50, and 60 have symbols and indicia thereon in accordance with the following chart which illustrates each key number and its associated letter, theme, portion of the human anatomy and proper name.

| Key # | Letter | Theme | Anatomy | Proper Name |
|---|---|---|---|---|
| 1 | A | Eating or Food | Arm | Ann |
| 2 | B | Bad or Danger | Bone | Bob |
| 3 | C | Cathedral or Chair | Coccyx | Cathy |
| 4 | D | Dressing or Clothing | Diaphragm | Dan |
| 5 | E | Transport or Travel | Ear | Everest |
| 6 | F | Ablutions, bathing or water | Feet | Fred |
| 7 | G | Philosophy or ideas | Gallbladder | God |
| 8 | H | Formalities, departures, greetings | Head | Hades |
| 9 | I | Personal opinions and disclosures | Eye | I |
| 10 | J | Logic or modality | Jugular | Jesus |
| 20 | K | Logic key and tag questions | Tongue | Tom |
| 29 | None | Medical | — | — |
| 30 | O | Happiness or positive expressions | Ovary | — |
| 50 | None | Type Mode | — | — |
| 60 | None | Electricity | — | — |

By reference to this chart an to the illustration of FIG. 2 examples of the operation of the keyboard of FIG. 2 in conjunction with the principles of the present invention can be understood. For example, key no. 1 bears the image of an apple, key no. 2 a turkey, key no. 3 a chair and key no. 4 a dressing. These keys also have the alphabetic sequence of A, B, C and D, anatomy portions such as an arm, a bone, a coccyx and a diaphragm; and the proper names Ann, Bob, Cathy and Dan. The electronic circuitry of the microprocessor 16 of FIG. 1 is programmed so that the actuation of any one key twice designates that key as the primary theme key. All other keys struck thereafter are associated with ideas related to the theme key which has been struck twice. For example, when key 1 is struck twice, the microprocessor 16 determines that it is desired to retrieve prerecorded sentences from EPROM 14 which are related to the theme of eating. Accordingly, when a key such as key 2 is struck subsequently to the double actuation of key 1 a prerecorded sentence "get that food out of my mouth" is retrieved from EPROM 14 and spoken by the combination of the voice synthesizer 18 and loudspeaker 20. In a similar fashion when key no. 3 is struck following double actuation of key no. 1, the sentence "There is something wrong with the position of my chair." is read out from EPROM 14 and spoken over loudspeaker 20. A similar combined use of key 4 with key 1 causes the voice synthesizer system of the present invention to say "Look out, the food is getting on my clothes."

The microprocessor 16 of FIG. 1 may also be programmed to recognize a single stroke of a key after the double actuation of the key designating a central theme as a negative expression. This is convenient because negative sentences are often of an emergency nature and need to be spoken quickly. A positive context to each of the foregoing sentences can be spoken by prefacing the actuation of the respective keys 2, 3, or with the actuation of key 30 which pictures an ironically smiling sun. That is, the negative context of this sentence can be changed to positive by prefacing the actuation of the selected keys 2, 3, 4, etc. with key 30. Accordingly, after a double hit on the eating theme key in no. 1 a user may say "It's okay, I'm not choking." by striking key 30 and then key 2. He may say "It's all right if a little food gets on my clothes." by hitting key 30 and then key 4. For a severely disabled person to say these sentences on a text-to-speech or phonemic system would require dozens of key acutations plus the ability to read and spell very well. In contrast the keyboards designed for use in the system of the present invention require no more than four key actuations for the examples referred to above and do not require the ability to read or spell in view of the use of the polysemic symbols such as the apple, turkey, cathedral, coat, shirt and necktie.

Of course, many other variations and combinations of the keys from the keyboard from FIG. 2 will result in the retrieval and output of other prerecorded sentences from EPROM 14. For example, key no. 1 which includes the central symbol of an apple and connotes the theme of eating can mean oil when actuated following the double actuation of key 3 which has chair as one of its polysemic meanings.

Key no. 2 which contains the central symbol of a turkey can mean bad or danger. When used in combination with the chair key no. 3 it can refer to "bad brakes" and in combination with the clothing key 4 it can mean that the user's belt is too tight or that his tie is choking him.

After key no. 5 (transport) it refers to the inability of the chair to go. After the medical key 29 it refers to bones, joint pains, etc. and can refer when joined with key no. 3 to specific abilities of the chair, problems of transporting of the chair, etc.

Key no. 3 is the chair key for people in wheelchairs. Cathedra is the Latin word for chair so a cathedral fascade is used in preference to the less attractive standard wheelchair symbol. This also promotes the polysemic aspects of this key in relation to other keys. For instance, when used with key no. 7 ($E=MC^2$) which stands for philosophy or abstractions in general, it means the philosophy of religion. It can also mean "face" as a verb as in "To face facts", etc. After medical key 29 it refers to the coccyx and seating problems, pressure points, etc.

Key no. 4 includes the central symbol which connotes the theme dressing or clothing In this particular illustration of key 4 there is depicted a male's clothing including a jacket, shirt and tie of various colors. Thus, as a theme key key no. 4 is associated with dressing and clothing and can be utilized to refer to specific colors if desired. When actuated after the medical key 29 the anatomy indicia of key no. 4 is utilized to retrieve a sentence related to the breathing function associated with the word "diaphragm".

Key no. 5 has the central symbol in the form of a curved arrow pointing in a direction towards a terminal point and refers to the general theme of "transport" or "travel." Thus, sentences would be recorded in the EPROM 14 related to trips, travel plans, visits and so forth and the actuation of key no. 5 as a theme key would selectively retrieve one of the sentences associated with travel depending which one of the other keys of the keyboard was actuated following the double actuation of key no. 5. For example, the double actuation of key no. 5 followed by the actuation of the key no. 1 would refer to eating plans associated with travel such as where one chooses to have dinner during their trip.

Key no. 6 has a central theme which deals with ablutions such as toileting, bathing, and things associated therewith. However, when used as a modifying key following the double actuation of another key which makes that key a theme key, it may have different meanings. For example, when key no. 6 is actuated following the double actuation of the electrical key 60, key no. 6 refers to water and could be used to retrieve a prerecorded sentence such as "There is no water in the battery of my wheelchair". Also under certain circumstances, key no. 6 including the central symbol of an outdoor privy could refer to privacy.

Key no. 7 includes the central symbol $E=MC^2$ and refers to the theme philosophy or ideas. When key no. 7 is double actuated to designate it as a theme key and is followed by the actuation of key no. 3 which illustrates the fascade of a cathedral the prerecorded sentence which is selectively retrieved from the memory of the EPROM 14 of FIG. 1 may be related to the philosophy of religion. In combination with the food key no. 1 it could announce a sentence such as "I am a vegetarian" expressing a philosophy associated with eating.

Key no. 8 includes the central symbol which depicts a portion of a male wearing a formal tuxedo. Accordingly the theme of key no. 8 is formalities, departures, greetings and so forth. Used as a theme it may selectively retrieve from memory prerecorded social statements such as "Pleased to meet you.", "It is my pleasure.", etc. When key no. 8 is not used as a theme but is used to modify or select specific sentences associated with theme keys it formalizes the annunciations and is therefore a key which connotes style or formality to a particular type of sentence. If actuated with the medical theme key 29, key no. 8 refers to the head portion of the anatomy.

Key no. 9 has the central symbol which in Chinese is the symbol for center "JONG". This symbol refers to the self. Thus as a theme it may refer to personal opinions and disclosures. In a subordinate sequence following the double actuation of another theme key it makes the user the subject or object of the sentence. When subordinated to the medical key 29 it refers to the eye portion of the anatomy.

Key no. 10 includes the central symbol which is a likeness of Bertrand Russell's profile. This key is merely used as a logic key or modality key to end a prior designated theme sequence For example, when key no. 10 is struck once the next sentence which is generated will be from a different theme. If it is struck twice it opens or clears the system for the initiation of other themes.

Key no. 20 is also a logic or modality key and may be utilized to introduce tag questions such as a question ending in "Didn't he?", "Aren't you?", "Won't they?", etc. In certain sequences it may mean to join or connect, as in the connection of a battery cable, etc.

Key no. 30 includes the central symbol of an ironically smiling sun and is utilized to change any negative context sentence into a positive one as described hereinbefore. Of course, key no. 30 may also be utilized to retrieve a sentence having an association to the ovary, the letter "O" or the numeral 30.

Key no. 50 is utilized as a special mode key. If this key is pushed twice it instructs the system to switch from a synthetic speech mode to a normal typewriter mode wherein each of the individual keys bearing the associated letters or numerals may simply type out those individual letters or symbols on paper as in a conventional typewriter. For example, a double actuation of key 50 transforms the entire keyboard illustrated in FIG. 2 into a typewriter keyboard with no prearranged sentences.

The above examples for the uses of the keys of FIG. 2 are illustrative only and it should be understood that many variations or modifications of the above examples may be made without departing from the spirit and scope of the present invention. It should be further understood that the associations between the various keys and the polysemic symbols thereon are more readily understood by an individual who has custom designed those symbols for a keyboard intended only for his own personal use. In that event this user would choose his own polysemic symbols and number of keys which are related to objects in his own lifestyle which can be readily understood and remembered. Therefore, when learning to use the synthetic speech system of the present invention the degree of memorization of the keyboard and the associated prerecorded sentences will be minimal to this user.

Figure 3:
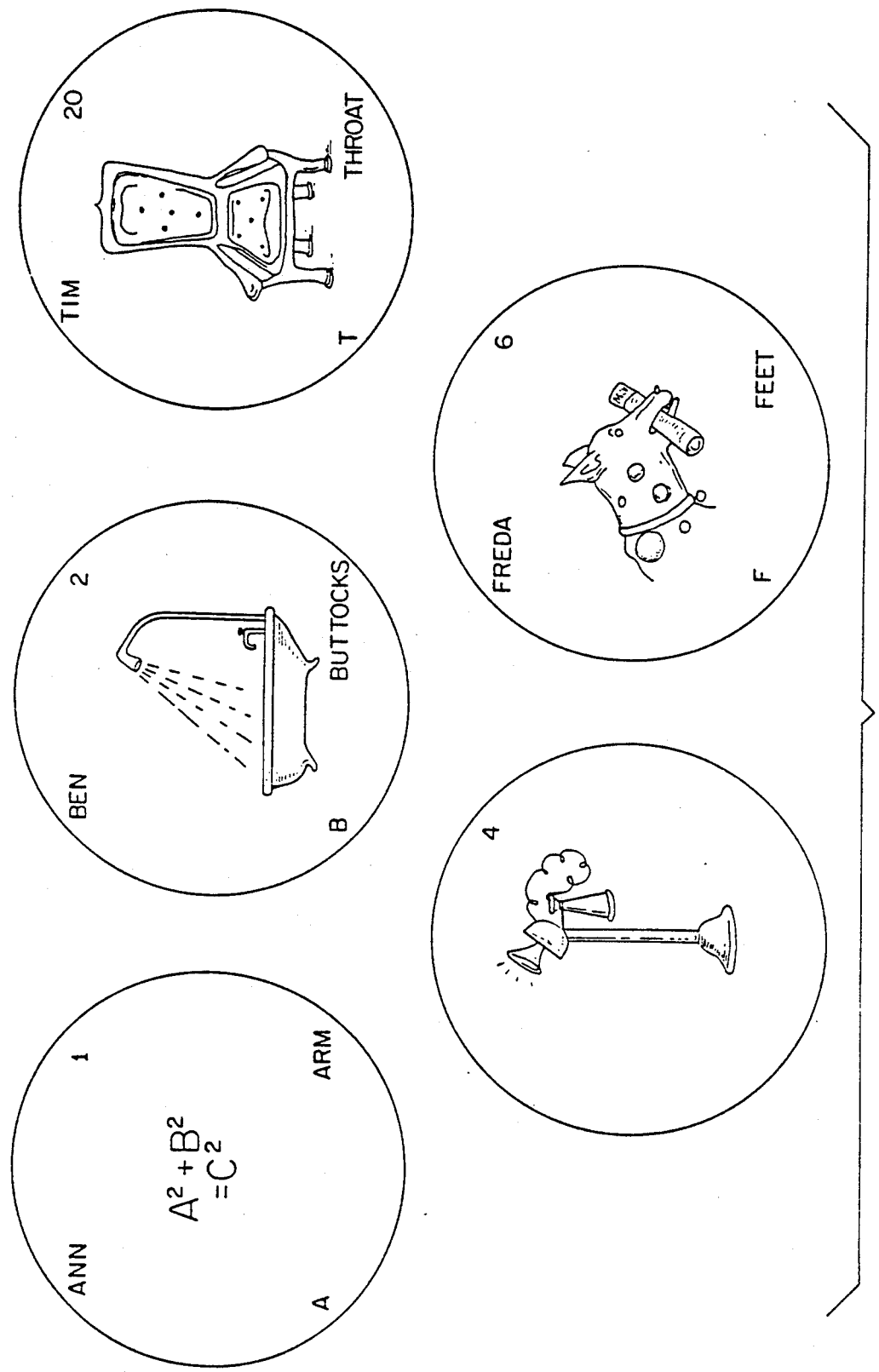
FIG. 3 illustrates an alternate embodiment of a group of keys to be used on another form of keyboard for use with the present invention.

The keyboard of FIG. 2 as stated hereinbefore is designed for use by an individual with a relatively high level of intellectual achievement and education. Accordingly, the polysemic symbols or real life objects and expressions chosen are somewhat complex but because of their complexity perhaps more generic than simpler symbols requiring no high level of educational exposure. However, it is clearly desirable to be able to adapt the present invention to users with a lower level of education by utilizing more simplistic symbols. Such a keyboard is illustrated by the group of keys depicted in FIG. 3. Key no. 1 in FIG. 3 has a central theme of mathematics or numbers depicted by Pythagorean's theorem $a^2+b^2=c^2$. As in the FIG. 2 keyboard each of these keys also includes indicia associated with a portion of the human anatomy, a proper name, a letter and a number. Key no. 2 in the keyboard of FIG. 3 is a simple illustration of a bathtub and a shower associated therewith connoting the central theme of water or bathing. Key no. 20 has a central symbol of a chair or a throne which could be associated with a handicap's wheelchair. Key no. 4 has a central symbol of a telephone which in a simple translation can connote telephoning, calling, etc. Key no. 6 depicts a dog fetching an object and therefore can connote the theme of putting, placing, etc.

Examples of operation of the keyboard of FIG. 3 are as follows: a double actuation of key no. 20 with the central symbol of a chair followed by the actuation of key no. 4 with the central symbol of a telephone may be utilized to selectively retrieve a prerecorded sentence such as "Call Potomac Valley Pharmacy about my wheelchair." The double actuation of key no. 20 followed by the actuation key no. 4 can selectively retrieve the sentence "Their number is in the phonebook" from the memory of the computer. The double actuation of key no. 20 followed by the sequential actuation of key 6, key 2, and key 60 can selectively retrieve the prerecorded sentence "Put water in the battery" from the memory of the computer. Again, the double actuation of the key 20 followed by the actuation of key 2 alone can selectively retrieve the sentence "Please clean my wheelchair."

Thus, it can be seen from the illustrative keyboards of FIGS. 2 and 3 that the use of the central polysemic symbols enables the selective retrieval of a wide variety of prerecorded sentences from a computer memory with a minimal amount of memorization and number of key strokes on the part of the user. Therefore, the keyboard's design in accordance with the concepts of the present invention provide a clear advance in the art over information retrieval systems which utilize keyboards with numbers, letters or individual words thereon to retrieve words, letters or phonemes stored in their individual form in a computer memory.

It can also be seen that the keyboard designs for use in the present invention are for the most part multilingual and therefore can be utilized as language translators.

Figure 4:
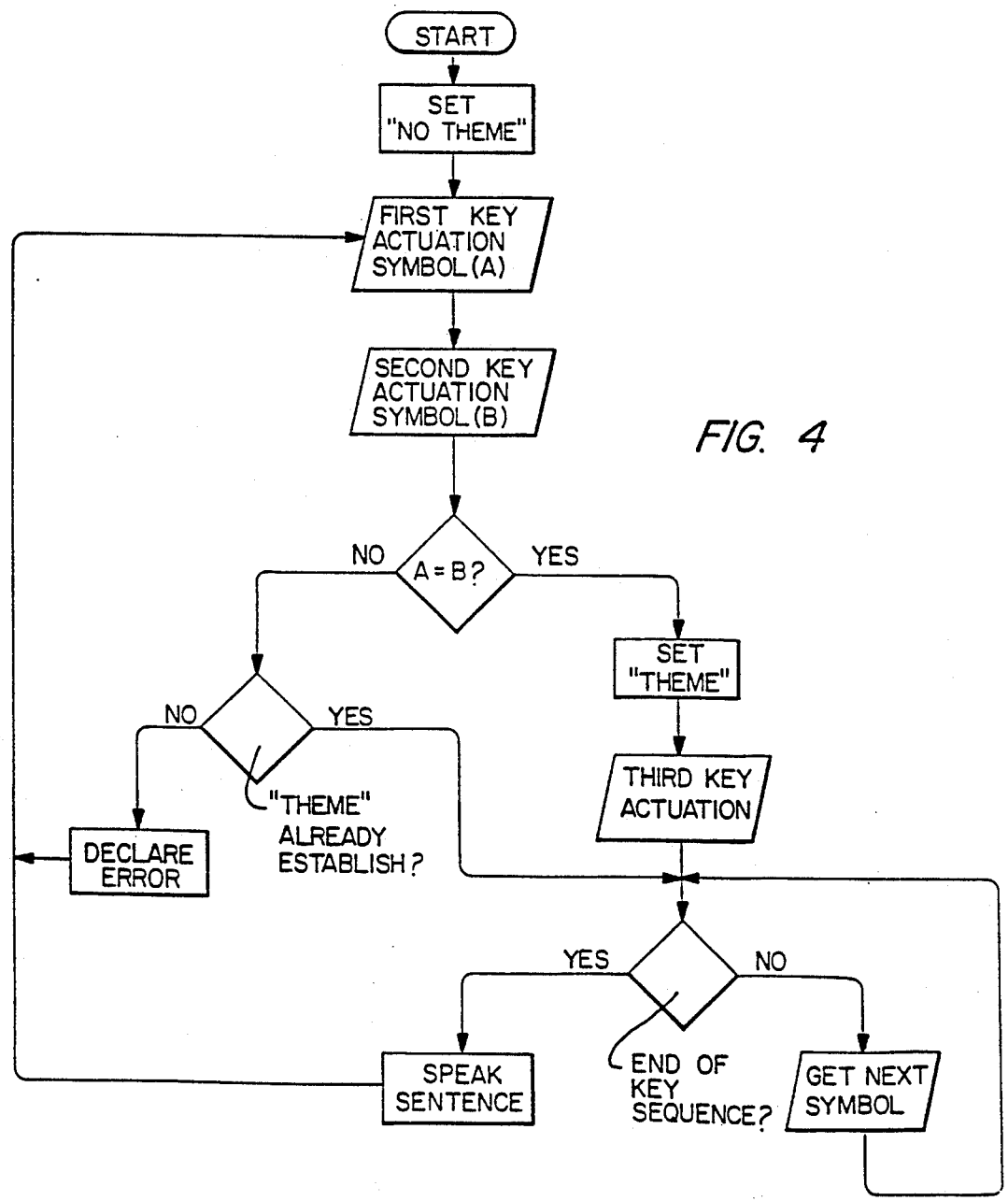
FIG. 4 is a flowchart of the data processing programs utilized to process information in the microprocessor constituting a portion of the block diagram illustrated in FIG. 1.

FIG. 4 is the general flowchart of a program for implementing classification and logic functions for information coming from the keyboards of FIGS. 2 or 3 into the memory of the microprocessor 16. That is, the flowchart of the program in FIG. 4 illustrates how the computer 16 classifies keys actuated twice at the beginning of a sequence as primary message theme keys and all successively actuated keys as modifying keys.

It should be understood that the system and method described herein may be modified as would occur to one of ordinary skill in the art without departing from the spirit and scope of the present invention.

What is claimed is:

1. A method for enabling an operator to retrieve and generate a selected plural word message from a large number of plural word messages relating to varied kinds of information stored in a system for producing messages, the system comprising memory means and a plurality of input devices actuable in any sequence the method comprising:

associating with each respective input device different polysemic pictorial illustrations of real life objects, said polysemic pictorial illustrations not including alphanumeric characters or formal, contemporary, oriental language characters, each illustration being suggestive to an operator of the system of a plurality of types of information;

defining a plurality of sequences of said polysemic pictorial illustrations, each sequence of illustrations being suggestive to an operator of the system of a semantic summary of a different plural word message;

selecting a sequence of a plurality of said polysemic pictorial illustrations which is suggestive to an operator of said semantic summary of said selected message, the number of polysemic pictorial illustrations in the selected sequence being much less than the number of alphanumeric characters which constitute the plural word message when represented by formal alphanumeric language characters;

actuating about two to four of said input devices having respectively and sequentially associated therewith said plurality of polysemic pictorial illustrations which is suggestive to an operator of said semantic summary of said selected message, thereby inputting a plurality of signals to the system indicative of which input devices have been actuated and in what sequence;

retrieving said selected message corresponding to said plurality of signals from the memory means of the system; and outputting said selected plural word message.

2. A method of claim 1 wherein said plural word message is a complete sentence.

3. A method of claim 1 wherein said input devices are keys on a keyboard.

4. A method as in claim 1, comprising audibly outputting said selected message.

5. A method as in claim 1, comprising outputting said selected message in a visually perceptible medium.

6. A method as in claim 1, comprising printing said selected message.

7. A method for enabling an operator to retrieve and generate a selected plural word message from a large number of plural word messages relating to varied kinds of information stored in a system for producing messages, the system comprising memory means and a plurality of input devices actuable in any sequence, the method comprising:

associating with each respective input device different polysemic pictorial illustrations of real life objects, each illustration being suggestive to an operator of the system of a plurality of types of information;

defining a plurality of sequences of said polysemic pictorial illustrations, each sequence of illustrations being suggestive to an operator of the system of a semantic summary of a different plural word message;

selecting a sequence of a plurality of said polysemic pictorial illustrations which is suggestive to an operator of said semantic summary of said selected message, the number of polysemic pictorial illustrations in the selected sequence being much less than the number of alphanumeric characters which constitute the plural word message when represented by formal alphanumeric language characters;

actuating a plurality of said input devices having respectively and sequentially associated therewith said plurality of polysemic pictorial illustrations which is suggestive to an operator of said semantic summary of said selected message, thereby inputting a plurality of signals to the system indicative of which input devices have been actuated;

retrieving said selected message corresponding to said plurality of signals from the memory means of the system; and outputting said selected plural word message.

8. A method of claim 7 wherein said plural word message is a complete sentence.

9. A method of claim 7 wherein said input devices are keys on a keyboard.

10. A method as in claim 7, comprising audibly outputting said selected message.

11. A method as in claim 7, comprising outputting said selected message in a visually perceptible medium.

12. A method as in claim 7, comprising printing said selected message.

13. A method for enabling an operator to retrieve and generate a selected plural word message from a large number of plural word messages relating to varied kinds of information stored in a system for producing messages, the system comprising memory means and a plurality of input devices actuable in any sequence, the method comprising:

associating with each respective input device different polysemic pictorial illustrations of real life objects, said polysemic pictorial illustrations not including alphanumeric characters or formal, contemporary, oriental language characters, each illustration being suggestive to an operator of the system of a plurality of types of information;

defining a plurality of sequences of said polysemic pictorial illustrations, each sequence of illustrations being suggestive to an operator of the system of a semantic summary of a different plural word message;

selecting a sequence of a plurality of said polysemic pictorial illustrations which is suggestive to an operator of said semantic summary of said selected message, the number of polysemic pictorial illustrations in the selected sequence being much less than the number of alphanumeric characters which constitute the plural word message when represented by formal alphanumeric language characters;

sequentially actuating a plurality of said input devices having respectively and sequentially associated therewith said plurality of polysemic pictorial illustrations which is suggestive to an operator of said semantic summary of said selected message, thereby inputting a plurality of signals to the system indicative of which input devices have been actuated and in what sequence;

retrieving said selected message corresponding to said plurality of signals from the memory means of the system; and outputting said selected plural word message.

14. A method of claim 13 wherein said plural word message is a complete sentence.

15. A method of claim 13 wherein said input devices are keys on a keyboard.

16. A method as in claim 13, comprising audibly outputting said selected message.

17. A method as in claim 13, comprising outputting said selected message in a visually perceptible medium.

18. A method as in claim 13, comprising printing said selected message.

* * * * *